United States Patent
Kawakita et al.

(10) Patent No.: US 12,053,918 B2
(45) Date of Patent: Aug. 6, 2024

(54) MULTILAYER FILM AND METHOD FOR PRODUCING SAME

(71) Applicant: KURARAY CO., LTD., Kurashiki (JP)

(72) Inventors: Hiroshi Kawakita, Tsukuba (JP); Katsuei Takahashi, Tsukuba (JP); Hiromitsu Sasaki, Kamisu (JP)

(73) Assignee: KURARAY CO., LTD., Okayama (JP)

( * ) Notice: Subject to any disclaimer, the term of this patent is extended or adjusted under 35 U.S.C. 154(b) by 1218 days.

(21) Appl. No.: 16/619,619

(22) PCT Filed: Jun. 6, 2018

(86) PCT No.: PCT/JP2018/021685
§ 371 (c)(1),
(2) Date: Dec. 5, 2019

(87) PCT Pub. No.: WO2018/225780
PCT Pub. Date: Dec. 13, 2018

(65) Prior Publication Data
US 2020/0139599 A1    May 7, 2020

(30) Foreign Application Priority Data
Jun. 6, 2017  (JP) ................. 2017-111840

(51) Int. Cl.
| | | |
|---|---|---|
| *B29C 48/18* | (2019.01) | |
| *B29C 45/14* | (2006.01) | |
| *B29C 48/885* | (2019.01) | |
| *B29C 63/02* | (2006.01) | |
| *B32B 27/08* | (2006.01) | |
| *B29K 23/00* | (2006.01) | |
| *B29K 25/00* | (2006.01) | |
| *B29K 209/06* | (2006.01) | |
| *B29L 31/00* | (2006.01) | |

(52) U.S. Cl.
CPC ........ *B29C 48/18* (2019.02); *B29C 45/14811* (2013.01); *B29C 48/885* (2019.02); *B29C 63/02* (2013.01); *B32B 27/08* (2013.01); *B29K 2023/12* (2013.01); *B29K 2025/08* (2013.01); *B29K 2209/06* (2013.01); *B29L 2031/722* (2013.01)

(58) Field of Classification Search
None
See application file for complete search history.

(56) References Cited

U.S. PATENT DOCUMENTS

| | | |
|---|---|---|
| 2013/0157069 A1 | 6/2013 | Minamide et al. |
| 2013/0196164 A1 | 8/2013 | Minamide et al. |
| 2014/0349127 A1 | 11/2014 | Minamide et al. |
| 2017/0029614 A1 | 2/2017 | Yagi et al. |
| 2017/0226390 A1 | 8/2017 | Minamide et al. |
| 2018/0002573 A1 | 1/2018 | Kawakita et al. |
| 2020/0109323 A1 | 4/2020 | Minamide et al. |

FOREIGN PATENT DOCUMENTS

| | | |
|---|---|---|
| CN | 103068915 A | 4/2013 |
| CN | 104024330 A | 9/2014 |
| CN | 106170515 A | 11/2016 |
| EP | 1 967 358 A1 | 9/2008 |
| JP | 11-320608 A | 11/1999 |
| JP | 2003-266615 A | 9/2003 |
| JP | 2008-094074 | 4/2008 |
| JP | 2014-168940 A | 9/2014 |
| JP | 2015-147396 A | 8/2015 |
| JP | 2017-7109 A | 1/2017 |
| JP | 2017-196749 | 11/2017 |

(Continued)

OTHER PUBLICATIONS

Translation of WO2013/161291.*
International Search Report issued on Aug. 7, 2018 in PCT/JP2018/021685 filed on Jun. 6, 2018, 2 pages.
Office Action issued in KR Patent Application No. 2019-7038968, dated Jul. 7, 2021, along with an English language translation.

(Continued)

*Primary Examiner* — Sheeba Ahmed
(74) *Attorney, Agent, or Firm* — GREENBLUM & BERNSTEIN, P.L.C.

(57) ABSTRACT

The present invention relates to a multilayered film having a high degree of freedom regarding selection of a material and a decoration method, which is not only excellent in handling properties and low-temperature adhesiveness to adherends of various materials but also applicable to decorative molding of every sort in a three-dimensional solid shape, and a method for producing the same. The present invention provides a multilayered film including, as an intermediate layer (X), a thermoplastic resin layer having a bending rigidity of 60 to 30,000 kPa·mm³; a layer (Y) composed of a thermoplastic polymer composition on both surfaces of the intermediate layer (X), the thermoplastic polymer composition containing 0 to 50 parts by mass of a polypropylene-based resin (B) based on 100 parts by mass of a thermoplastic elastomer (A) that is a block copolymer containing a polymer block (a1) composed of an aromatic vinyl compound unit and a polymer block (a2) composed of a conjugated diene compound unit; and a decorative layer (Z) closely arranged on the surface of either one of the layers (Y). The present invention also provides a method for producing the multilayered film, including bringing the thermoplastic resin layer (Y) as a surface layer in a molten state into contact with a roll whose surface is made of a hydrophobic resin.

12 Claims, No Drawings

(56) References Cited

FOREIGN PATENT DOCUMENTS

| KR | 2014-0038509 | 3/2014 |
|----|--------------|--------|
| WO | WO 2012/005270 A1 | 1/2012 |
| WO | WO 2013/161291 A1 | 10/2013 |
| WO | 2016/121868 | 8/2016 |
| WO | WO 2017/200059 A1 | 11/2017 |

OTHER PUBLICATIONS

Office Action issued in CN Patent Application No. 201880037475.4, dated Mar. 8, 2021, along with an English translation.
Extended European Search Report issued in EP Patent Application No. 18813067.8, dated Feb. 9, 2021.

* cited by examiner

MULTILAYER FILM AND METHOD FOR PRODUCING SAME

TECHNICAL FIELD

The present invention relates to a multilayered film suitable for decoration of an article having a three-dimensional solid surface and a method for producing the same.

BACKGROUND ART

Ceramics, metals, and synthetic resins which are excellent in designability, durability, heat resistance, and mechanical strength are widely used for various applications inclusive of household appliances, electronic parts, machine parts, automobile parts, and so on. There is a case where these members are used upon bonding or complexing of different materials each other, depending upon an application, a parts structure, a use method, and so on. In particular, resin-made decorative films are used for exteriors or wallpapers of household appliances, interiors of automobiles, and so on, for the purpose of imparting a decoration with a pattern, such as a wood-grain pattern, or designability with a metallic tone, a piano black tone, etc., and imparting functionality, such as scratch resistance and weather resistance. The resin-made decorative films can be subjected to thermoforming and can be brought into intimate contact with a surface of the article frequently having a three-dimensional solid shape as mentioned above, and therefore, they have been being preferably used.

In order to bring the decorative film and an article into intimate contact with each other, for example, there is known a method in which a decorative film having an adhesive applied thereonto is inserted into an injection mold and subjected to injection molding to obtain a decorative molded product. This is a method generally called a film insert injection molding method. However, a problem that the adhesive is flowed due to a molten resin to be injection molded, and an adhesive force between the decorative film and the molded product is reduced has been pointed out.

In order to solve the aforementioned problem, for example, in PTL 1, a so-called backing film is used. PTL 1 describes a method in which after sticking and closely contacting a substrate resin layer (backing layer) and a decorative film with each other via an adhesive, the laminated film and a molded product obtained by preforming the laminated film in a three-dimensional solid shape are set in an injection mold, and a molten resin of the same kind of the substrate resin layer is injection molded from the opposite surface to the decorative film, thereby obtaining a decorative molded product.

PTL 2 describes a method in which an adhesive layer-provided decorative film obtained by forming a release layer on a substrate film and then applying a clear coating film layer, a design layer, and an adhesive layer in this order is pressurized under vacuum conditions to coat and stick in a three-dimensional solid shape, and the substrate film and the release layer are then released to obtain a decorative molded product.

PTL 3 proposes a method for producing a bonded body, in which a film composed of a resin composition containing a block copolymer having a polymer product containing an aromatic vinyl compound unit and a polymer block containing a conjugated diene compound unit, or a thermoplastic elastomer that is a hydrogenated material of the foregoing block copolymer, and a polar group-containing polypropylene-based resin is laminated on an insert member, and subsequently, the resin member is subjected to insert injection molding, and also expresses the case where the insert member and the resin member are a different material from each other.

CITATION LIST

Patent Literature

PTL 1: JP 11-320608 A
PTL 2: JP 2017-7109 A
PTL 3: JP 2014-168940 A

SUMMARY OF INVENTION

Technical Problem

It is demanded that the decoration is applicable to adherends having various three-dimensional solid shapes.

In the film described in PTL 1, the material of the injection molding resin, namely the material of the adherend having a three-dimensional solid shape is restricted depending upon the material of the backing layer. Accordingly, the backing layer and the film in which the material of the adhesive to be applied to the backing layer has been changed must be prepared for every material of the adherend. In this case, since the number of brands increases, switching or a labor on the control, or the like is problematic. In addition, with respect to the decoration method, the film described in PTL 1 is compatible with only the film insert injection molding method, so that the decoration method is restricted. In order that the decoration method may be compatibilized with various adherend shapes, it is required to be able to be compatibilized with methods, such as a vacuum molding method, a pressure molding method, a vacuum pressure molding method, and a compression molding method. However, in the conventionally known backing film structures, it is impossible to adhere the film to an adherend according to the aforementioned respective methods.

In the film described in PTL 2, in view of the fact that the adhesive is applied, it is possible to adhere the film to various adherend shapes at a low temperature, as compared with the injection molding temperature. However, the tackiness of the adhesive is high, so that faults, such as adhesion of foreign substances, e.g., environmental contaminants, and sticking between the adhered surfaces, are caused, resulting in a problem of a decrease of yield.

In the film described in PTL 3, it is possible to undergo hot melt bonding of different materials having a different polarity from each other at a low temperature (100° C. or higher) as compared with the injection molding temperature. However, in the case of applying the foregoing film to the aforementioned various methods which are capable of being compatibilized with the various adherend shapes, on setting the film in a molding machine, there is a case where the film is warped, so that the manageability is poor, or wrinkles are generated on the decorative surface. In addition, on performing the film insert injection molding, shape retention properties of the preformed molded product are low, and setting properties in a die are poor, resulting in a problem, such as dropping of the preformed molded product and turning around of the injection molding resin.

An object of the present invention is to provide a multilayered film having a high degree of freedom regarding selection of a material and a decoration method, which is not only excellent in handling properties and low-temperature adhesiveness to adherends of various materials but also applicable to decorative molding of every sort in a three-dimensional solid shape, and a method for producing the same.

Solution to Problem

In accordance with the present invention, the aforementioned object is achieved by providing the following [1] to [12]

[1] A multilayered film for decorative molding of an adherend having a three-dimensional solid surface, the multilayered film including, as an intermediate layer (X), a thermoplastic resin layer having a bending rigidity of 60 to 30,000 kPa·mm$^3$; a layer (Y) composed of a thermoplastic polymer composition on both surfaces of the intermediate layer (X), the thermoplastic polymer composition containing 0 to 50 parts by mass of a polypropylene-based resin (B) based on 100 parts by mass of a thermoplastic elastomer (A) that is a block copolymer containing a polymer block (a1) composed of an aromatic vinyl compound unit and a polymer block (a2) composed of a conjugated diene compound unit, or a hydrogenated product thereof; and a decorative layer (Z) closely arranged on the surface of either one of the layers (Y).

[2] The multilayered film as set forth in the above [1], wherein the conjugated diene compound constituting the polymer block (a2) in the thermoplastic elastomer (A) is butadiene, isoprene, or butadiene and isoprene, and the sum total of a 1,2-bond amount and a 3,4-bond amount in the polymer block (a2) is from 35 to 98 mol %.

[3] The multilayered film as set forth in the above [1] or [2], wherein the content of the thermoplastic elastomer (A) in the thermoplastic polymer composition is 50% by mass or more.

[4] The multilayered film as set forth in any of the above [1] to [3], wherein the content of a tackifying resin in the thermoplastic polymer composition is less than 1% by mass.

[5] The multilayered film as set forth in any of the above [1] to [4], wherein the polypropylene-based resin (B) is a polar group-containing polypropylene-based resin (B1).

[6] The multilayered film as set forth in any of the above [1] to [5], wherein in the thermoplastic resin to be used in the intermediate layer (X), a melt flow rate (MFR) measured under conditions at a temperature of 230° C. under a load of 2.16 kg (21.2 N) is 0.1 to 20 g/10 min, and an MFR ratio (Y)/(X) of the thermoplastic polymer composition layer (Y) to the intermediate layer (X), as measured under conditions at a temperature of 230° C. under a load of 2.16 kg (21.2 N), is from 1 to 15.

[7] The multilayered film as set forth in any of the above [1] to [6], wherein a thickness ratio (Y)/(X) of the thermoplastic polymer composition layer (Y) to the intermediate layer (X) is from 0.1 to 18.

[8] The multilayered film as set forth in any one of the above [1] to [7], which is applied for any of a vacuum molding method, a pressure molding method, a vacuum pressure molding method, a compression molding method, or a preform and film insert injection molding method.

[9] A method for producing a multilayer film that is a production method of the multilayered film having the thermoplastic polymer composition layer (Y) on the both surfaces of the intermediate layer (X) as set forth in any of the above [1] to [7], the method including bringing the thermoplastic resin layer (Y) as a surface layer in a molten state into contact with a roll whose surface is made of a hydrophobic resin.

[10] A method for producing a multilayered film that is a production method of the multilayered film having the thermoplastic polymer composition layer (Y) on the both surfaces of the intermediate layer (X) as set forth in any of the above [1] to [7], the method including a step of laminating the intermediate layer (X) and the thermoplastic resin layer (Y) through coextrusion.

[11] The method for producing the multilayered film as set forth in the above [10], the method further including, after the lamination step, a step of bringing the thermoplastic resin layer (Y) as a surface layer in a molten state into contact with a cast roll whose surface is made of a hydrophobic resin.

[12] A method for producing a multilayered film that is a production method of the multilayered film as set forth in any of the above [1] to [8], the method including sticking the decorative layer (Z) on either one surface of the multilayered film having the thermoplastic polymer composition layer (Y) on the both surfaces of the intermediate layer (X) by thermal lamination using two heating rollers.

Advantageous Effects of Invention

The multilayered film of the present invention is excellent in handling properties and low-temperature adhesiveness to adherends of various materials. Accordingly, the multilayered film of the present invention is able to be firmly adhered to and decorated on both a decorative film and an adherend of every sort. In addition, the multilayered film of the present invention has shape retention properties and is applicable for decorative molding of every sort in a three-dimensional solid shape.

DESCRIPTION OF EMBODIMENTS

[Multilayered Film]

The multilayered film of the present invention is a multilayered film having a structure of at least four layers, the multilayered film including, as an intermediate layer (X), a thermoplastic resin layer having a bending rigidity of 60 to 30,000 kPa·mm$^3$; a layer (Y) composed of a thermoplastic polymer composition on both surfaces of the intermediate layer (X), the thermoplastic polymer composition containing 0 to 50 parts by mass of a polypropylene-based resin (B) based on 100 parts by mass of a thermoplastic elastomer (A) that is a block copolymer containing a polymer block (a1) composed of an aromatic vinyl compound unit and a polymer block (a2) composed of a conjugated diene compound unit, or a hydrogenated product thereof; and a decorative layer (Z) closely arranged on the surface of either one of the layers (Y), wherein an MFR ratio (Y)/(X) of the thermoplastic polymer composition layer (Y) to the intermediate layer (X), as measured under conditions at a temperature of 230° C. under a load of 2.16 kg (21.2 N), is 1 to 15. Hereinafter, each layer will be described in order.

<Intermediate Layer (X)>

The thermoplastic resin which is used for the intermediate layer (X) is not limited so long as it is usable for known film substrates. Examples thereof include a polyolefin-based resin, a polystyrene-based resin, a polyvinyl chloride resin, an acrylonitrile styrene resin, an ABS resin (acrylonitrile butadiene styrene resin), a polycarbonate resin, a polyester-based resin, a (meth)acrylic resin, ZEONOR (a registered trademark) and ZEONEX (a registered trademark), both of which are manufactured by Zeon Corporation, and ARTON (a registered trademark), manufactured by JSR Corporation. Above all, from the viewpoint of mechanical physical properties, adhesiveness, and handling properties, a polyolefin-based resin and a polyester-based resin are preferred, and a polypropylene-based resin is especially preferred.

In the present invention, though a variety of polypropylene-based resins can be used, those in which the content of a structural unit derived from propylene (hereinafter sometimes abbreviated as "propylene content") is 60 mol % or more are preferred. The content of the structural unit derived from propylene is preferably 80 mol % or more, more preferably 90 to 100 mol %, and still more preferably 95 to 99 mol %. Examples of a structural unit derived from other compound than propylene include a structural unit derived from ethylene; and a structural unit derived from an α-olefin, such as 1-butene, 1-hexene, 1-heptene, 1-octene, 4-methyl-1-pentene, 1-nonene, and 1-decene; and besides, a structural unit derived from a modifying agent as mentioned later.

Examples of the polypropylene-based resin which is used for the intermediate layer (X) include homopolypropylene, block polypropylene, a propylene-ethylene random copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and modified products thereof. Examples of the modified product include one obtained through graft copolymerization of a modifying agent on a polypropylene-based resin; and one obtained through copolymerization of a modifying agent on a main chain of a polypropylene-based resin. Examples of the modifying agent include unsaturated dicarboxylic acids, such as maleic acid, citraconic acid, a halogenated maleic acid, itaconic acid, cis-4-cyclohexene-1,2-dicarboxylic acid, and endo-cis-bicyclo[2.2.1]-5-heptene-2,3-dicarboxylic acid; esters, amides, or imides of unsaturated dicarboxylic acids; unsaturated dicarboxylic acid anhydrides, such as maleic anhydride, citraconic anhydride, a halogenated maleic anhydride, itaconic anhydride, cis-4-cyclohexene-1,2-dicarboxylic acid anhydride, and endo-cis-bicyclo[2.2.1]-5-heptene-2,3-dicarboxylic acid anhydride; unsaturated monocarboxylic acids, such as acrylic acid, methacrylic acid, and crotonic acid; and esters of unsaturated monocarboxylic acids (e.g., methyl acrylate, ethyl acrylate, methyl methacrylate, and ethyl methacrylate), amides or imides of unsaturated monocarboxylic acids. The polypropylene-based resin which is used for the polypropylene-based resin layer (X) is preferably an unmodified polypropylene-based resin.

Above all, from the viewpoint of being easily available at a relatively low cost, homopolypropylene, a propylene-ethylene random copolymer, and block polypropylene are preferred. Furthermore, from the viewpoint of an adhesive force to the polyolefin-based resin and the viewpoint of reduction in warpage of the multilayered film, a propylene-ethylene random copolymer is especially preferred.

The polypropylene-based resin may be used alone or may be used in combination of two or more thereof. In addition, the intermediate layer (X) may further contain other resin in addition to the aforementioned polypropylene-based resin within a range where the effects of the present invention are not impaired.

As for the thermoplastic resin which is used for the intermediate layer (X), from the viewpoint of molding processability of the resin composition (X), its melt flow rate (MFR) measured under conditions at a temperature of 230° C. under a load of 2.16 kg (21.2 N) is preferably 0.1 to 20 g/10 min, more preferably 0.3 to 15 g/10 min, and still more preferably 0.6 to 10 g/10 min.

All of the "melt flow rates" described in this specification and the claims are a value measured in conformity with JIS K7210.

Although a flow beginning temperature of the thermoplastic resin is not particularly limited, it is preferably 120 to 190° C., and more preferably 120 to 180° C. Although the flow beginning temperature is in general defined on an amorphous resin, in this specification, it should be construed that the flow beginning temperature of a crystalline resin is one represented by a melting point.

From the viewpoint of handling properties in molding of the multilayered film and die setting properties of the preformed molded product in insert injection molding, a bending rigidity of the thermoplastic resin which is used for the intermediate layer (X) is preferably 60 to 30,000 kPa·mm$^3$, more preferably 60 to 10,000 kPa·mm$^3$, and still more preferably 100 to 5,000 kPa·mm$^3$. When the bending rigidity is lower than 60 kPa·mm$^3$, the film and the preformed molded product are liable to be deformed, whereas when it is higher than 30,000 kPa·mm$^3$, there is a case where film shaping properties are lowered, so that the moldability is inferior.

<Thermoplastic Polymer Composition Layer (Y)>

The thermoplastic polymer composition constituting the thermoplastic polymer composition layer (Y) contains a thermoplastic elastomer (A) that is a block copolymer containing a polymer block (a1) composed of an aromatic vinyl compound unit and a polymer block (a2) composed of a conjugated diene compound unit, or a hydrogenated product thereof. The content of the thermoplastic elastomer (A) in the aforementioned thermoplastic polymer composition is preferably 50% by mass or more, and more preferably 65% by mass or more.

Thermoplastic Elastomer (A)

Examples of the aromatic vinyl compound constituting the polymer block (a1) composed of an aromatic vinyl compound unit, which is contained in the thermoplastic elastomer (A), include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene. The polymer block containing an aromatic vinyl compound unit may be composed of a structural unit derived from only one of these aromatic vinyl compounds or may be composed of structural units derived from two or more thereof. Above all, styrene, α-methylstyrene, and 4-methylstyrene are preferred.

The polymer block (a1) composed of an aromatic vinyl compound unit is a polymer block containing preferably 80% by mass or more of an aromatic vinyl compound unit, more preferably 90% by mass or more of an aromatic vinyl compound unit, and still more preferably 95% by mass or more of an aromatic vinyl compound unit. Although the polymer block (a1) may have only an aromatic vinyl compound unit, it may have other copolymerizable monomer unit together with an aromatic vinyl compound unit so long as the effects of the present invention are not impaired. Examples of the other copolymerizable monomer include 1-butene, pentene, hexene, butadiene, isoprene, and methyl vinyl ether. In the case of having the other copolymerizable monomer unit, its content is preferably 20% by mass or less, more preferably 10% by mass or less, and still more preferably 5% by mass or less relative to the total amount of the aromatic vinyl compound unit and the other copolymerizable monomer unit.

Examples of the conjugated diene compound constituting the polymer block (a2) composed of a conjugated diene compound unit, which is contained in the thermoplastic elastomer (A), include butadiene, isoprene, 2,3-dimethyl-1,3-butadiene, 1,3-pentadiene, and 1,3-hexadiene. Above all, butadiene and isoprene are preferred.

The polymer block (a2) containing the conjugated diene compound unit may be composed of a structural unit derived from only one of these conjugated diene compounds or may be composed of structural units derived from two or more thereof. In particular, it is preferred that the polymer block (a2) is composed of a structural unit derived from butadiene or isoprene, or structural units derived from butadiene and isoprene.

The polymer block (a2) composed of a conjugated diene compound unit is a polymer block containing preferably 80% by mass or more of a conjugated diene compound unit, more preferably 90% by mass or more of a conjugated diene compound unit, and still more preferably 95% by mass or more of a conjugated diene compound unit. Although the polymer block (a2) may have only a conjugated diene compound unit, it may have other copolymerizable monomer unit together with a conjugated diene compound unit so long as the present invention is not hindered. Examples of the other copolymerizable monomer include styrene, α-methylstyrene, and 4-methylstyrene. In the case of having the other copolymerizable monomer unit, a ratio thereof is preferably 20% by mass or less, more preferably 10% by mass or less, and still more preferably 5% by mass or less relative to the total amount of the conjugated diene compound unit and the other copolymerizable monomer unit.

A binding mode of the conjugated diene constituting the polymer block (a2) is not particularly limited. For example, in the case of butadiene, a 1,2-bond or a 1,4-bond can be taken, and in the case of isoprene, a 1,2-bond, a 3,4-bond, or a 1,4-bond can be taken. Among these, in the case where the polymer block composed of the conjugated diene compound unit is composed of butadiene, in the case where it is composed of isoprene, or in the case where it is composed of both butadiene and isoprene, the sum total of the 1,2-bond amount and the 3,4-bond amount in the polymer block composed of the conjugated diene compound unit is more preferably 35 to 98 mol %, still more preferably 40 to 90 mol %, and yet still more preferably 50 to 80 mol %.

The total amount of the 1,2-bond amount and the 3,4-bond amount can be calculated by means of $^1$H-NMR measurement. Specifically, the total amount of the 1,2-bond amount and the 3,4-bond amount can be calculated from a ratio of an integrated value of peaks appearing at 4.2 to 5.0 ppm, which are derived from the 1,2-bond unit and the 3,4-bond unit, and an integrated value of a peak appearing at 5.0 to 5.45 ppm derived from the 1,4-bond unit.

A binding mode between the polymer block (a1) composed of the aromatic vinyl compound unit and the polymer block (a2) composed of the conjugated diene compound unit in the thermoplastic elastomer (A) is not particularly limited, and though it may be any of linear, branched, and radial binding modes, or a combined binding mode of two or more thereof, it is preferably a linear binding mode.

When the polymer block (a1) is represented by "a", and the polymer block (a2) is represented by "b", examples of the linear binding mode include a diblock copolymer represented by "a-b"; a triblock copolymer represented by "a-b-a" or "b-a-b"; a tetrablock copolymer represented by "a-b-a-b"; a pentablock copolymer represented by "a-b-a-b-a" or "b-a-b-a-b"; an (a-b)nX type copolymer (X represents a coupling reside, and n represents an integer of 2 or more); and a mixture thereof. Of these, a triblock copolymer is preferred, and a triblock copolymer represented by "a-b-a" is more preferred.

From the viewpoint of flexibility and mechanical characteristics, the content of the polymer block (a1) composed of the aromatic vinyl compound unit in the thermoplastic elastomer (A) is preferably 5 to 75% by mass, more preferably 5 to 60% by mass, and still more preferably 10 to 40% by mass relative to the whole of the thermoplastic elastomer (A).

From the viewpoint of improving the heat resistance and the weather resistance, in the thermoplastic elastomer (A), it is preferred that a part or the whole of the polymer block (a2) is hydrogenated. On that occasion, a hydrogenation rate thereof is preferably 80% or more, and more preferably 85% or more. Here, in this specification, the hydrogenation rate is a value obtained through measurement of an iodine value of the block copolymer before and after the hydrogenation reaction.

From the viewpoint of mechanical characteristics and molding processability, a weight average molecular weight of the thermoplastic elastomer (A) is preferably 30,000 to 500,000, more preferably 50,000 to 400,000, still more preferably 60,000 to 200,000, yet still more preferably 70,000 to 200,000, especially preferably 70,000 to 190,000, and most preferably 80,000 to 180,000. Here, the weight average molecular weight is a weight average molecular weight expressed in terms of polystyrene, as determined by means of gel permeation chromatography (GPC) measurement.

The thermoplastic elastomer (A) may be used alone or may be used in combination of two or more thereof.

Although the thermoplastic elastomer (A) is not particularly limited with respect to a production method thereof, it can be, for example, produced by an anionic polymerization method. Specifically, examples thereof include (i) a method of using an alkyllithium compound as an initiator and successively polymerizing the aromatic vinyl compound, the conjugated diene compound, and subsequently the aromatic vinyl compound; (ii) a method of successively polymerizing the aromatic vinyl compound and the conjugated diene compound with an alkyllithium compound as an initiator and then adding a coupling agent, to undergo coupling; and (iii) a method of successively polymerizing the conjugated diene compound and subsequently the aromatic vinyl compound with a dilithium compound as an initiator.

On the occasion of the anionic polymerization, by adding an organic Lewis base, the 1,2-bond amount and the 3,4-bond amount of the thermoplastic elastomer (A) can be increased, and the 1,2-bond amount and the 3,4-bond amount of the thermoplastic elastomer (A) can be readily controlled according to the addition amount of the organic Lewis base.

Furthermore, by subjecting the unhydrogenated thermoplastic elastomer (A) as obtained above to a hydrogenation reaction, the hydrogenated product of the thermoplastic elastomer (A) can be produced. The hydrogenation reaction can be performed by allowing the unhydrogenated thermoplastic elastomer (A) as obtained above to react with hydrogen in the presence of a hydrogenation catalyst by dissolving the unhydrogenated thermoplastic elastomer (A) in a solvent that is inert to the reaction and the hydrogenation catalyst, or directly using without isolating the unhydrogenated thermoplastic elastomer (A) from the aforementioned reaction liquid.

As the thermoplastic elastomer (A), a commercially available product can also be used.

Polypropylene-Based Resin (B)

The thermoplastic polymer composition constituting the thermoplastic polymer composition layer (Y) may further contain a polypropylene-based resin (B). By containing the polypropylene-based resin (B), as compared with the case of not containing it, the thermoplastic polymer composition is excellent in film formability, and the obtained multilayered film is excellent in coextrusion film formability.

As the polypropylene-based resin (B), though a known polypropylene-based resin can be used, those in which the content of a structural unit derived from propylene is 60 mol % or more are preferred. The content of the structural unit derived from propylene is preferably 80 to 100 mol %, more preferably 90 to 100 mol %, and still more preferably 95 to 99 mol %. Examples of a structural unit derived from other compound than propylene include a structural unit derived from ethylene; and a structural unit derived from an α-olefin, such as 1-butene, 1-hexene, 1-heptene, 1-octene, 4-methyl-1-pentene, 1-nonene, and 1-decene; and besides, a structural unit derived from a modifying agent as mentioned later.

Examples of the polypropylene-based resin (B) include homopolypropylene, block polypropylene, a propylene-ethylene random copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and modified products thereof. Examples of the modified product include one obtained through graft copolymerization of a modifying agent on a polypropylene-based resin; and one obtained through copolymerization of a modifying agent on a main chain of a polypropylene-based resin.

Of these, the polypropylene-based resin (B) is preferably a polar group-containing polypropylene-based resin (B1) that is the modified product. By using the polar group-containing polypropylene-based resin (B1) as the polypropylene-based resin (B), not only the film formability is excellent, but also the adhesive force of the thermoplastic polymer composition is improved, the intermediate layer (Y) also exhibits a favorable adhesive performance to metallic components, the polypropylene-based resin layer (X) and the decorative layer (Z) can be firmly adhered to each other, and delamination can be prevented from occurring.

Examples of the polar group which the polar group-containing polypropylene-based resin (B1) has include a (meth)acryloxy group; a hydroxy group; an amide group; a halogen atom, such as a chlorine atom; a carboxy group; and an acid anhydride group.

Although the polar group-containing polypropylene-based resin (B1) is not particularly limited with respect to a production method thereof, it is obtained through random copolymerization, block copolymerization, or graft copolymerization of propylene and a polar group-containing copolymerizable monomer that is the modifying agent, by a known method. The polar group which the polar group-containing polypropylene-based resin (B1) has may be subjected to a post-treatment after the polymerization. For example, neutralization of a (meth)acrylic acid group or a carboxy group with a metal ion may be performed to form an ionomer, and esterification with methanol, ethanol, or the like may also be performed. In addition, hydrolysis of vinyl acetate, or the like may also be performed.

A ratio of the polar group-containing structural unit which the polar group-containing polypropylene-based resin (B1) has to all of the structural units which the polar group-containing polypropylene-based resin (B1) has is preferably 0.01 to 20% by mass. When the ratio of the polar group-containing structural unit is 0.01% by mass or more, the adhesiveness becomes higher. When the ratio of the polar group-containing structural unit is 20% by mass or less, an affinity with the thermoplastic elastomer (A) is improved, the mechanical characteristics become favorable, and the formation of a gel is suppressed. From the same viewpoint, the foregoing ratio is preferably 0.01 to 7% by mass, more preferably 0.01 to 5% by mass, still more preferably 0.1 to 3% by mass, and yet still more preferably 0.2 to 1% by mass. In order that the ratio of the polar group-containing structural unit may become optimum, one prepared by diluting a polypropylene-based resin having a polar group-containing structural unit in a high concentration with a polypropylene-based resin not having a polar group-containing structural unit may also be used.

The thermoplastic polymer composition constituting the thermoplastic polymer composition layer (Y) preferably contains 0 to 50 parts by mass of the polypropylene-based resin (B) based on 100 parts by mass of the thermoplastic elastomer (A). When the polypropylene-based resin is contained, a degree of freedom regarding selection of the thermoplastic elastomer needed for obtaining favorable coextrusion film formability of the multilayered film is improved. In addition, when the content of the polypropylene-based resin (B) is excessively high, there is a case where the adhesive force is lowered, and delamination is caused. From such a viewpoint, the content of the polypropylene-based resin (B) is preferably 1 part by mass or more and preferably 50 parts by mass or less based on 100 parts by mass of the thermoplastic elastomer (A). The content of the polypropylene-based resin (B) is more preferably 5 parts by mass or more and 45 parts by mass or less, and still more preferably 10 parts by mass or more and 30 parts by mass or less.

Other Optional Components

The thermoplastic polymer composition constituting the thermoplastic polymer composition layer (Y) may contain other thermoplastic polymer, such as an olefin-based polymer, a styrene-based polymer, a polyphenylene ether-based resin, and a polyethylene glycol, as the need arises, within a range where the effects of the present invention are not conspicuously impaired. Examples of the olefin-based polymer include polyethylene, polypropylene, polybutene, and a block copolymer or a random copolymer of propylene and ethylene or other α-olefin, such as 1-butene. When such other thermoplastic polymer is contained, the content of the thermoplastic elastomer (A) is not lower than 50% by mass, and hence, such is preferred.

That is, in the case where the other thermoplastic polymer is contained, its content is preferably 100 parts by mass or less, more preferably 50 parts by mass or less, still more preferably 20 parts by mass or less, yet still more preferably 10 parts by mass or less, and especially preferably 5 parts by mass or less based on 100 parts by mass of the thermoplastic elastomer (A).

The thermoplastic polymer composition constituting the thermoplastic polymer composition layer (Y) may contain a tackifying resin, a softening agent, an antioxidant, a lubricant, a photostabilizer, a processing aid, a colorant, such as a pigment and a dye, a flame retarder, an antistatic agent, a matting agent, a silicon oil, an antiblocking agent, an ultraviolet absorber, a release agent, a blowing agent, an antibacterial agent, an antifungal agent, a fragrance, and so on, as the need arises, within a range where the effects of the present invention are not impaired.

Examples of the tackifying resin include an aliphatic unsaturated hydrocarbon resin, an aliphatic saturated hydrocarbon resin, an alicyclic unsaturated hydrocarbon resin, an alicyclic saturated hydrocarbon resin, an aromatic hydrocarbon resin, a hydrogenated aromatic hydrocarbon resin, a rosin ester resin, a hydrogenated rosin ester resin, a terpene phenol resin, a hydrogenated terpene phenol resin, a terpene resin, a hydrogenated terpene resin, an aromatic hydrocarbon-modified terpene resin, a coumarone-indene resin, a phenol resin, and a xylene resin.

As the softening agent, softening agents which are generally used for rubbers or plastics can be used.

Examples of the antioxidant include hindered phenol-based, phosphorus-based, lactone-based, or hydroxy-based antioxidants. Of these, a hindered phenol-based antioxidant is preferred.

The thermoplastic polymer composition constituting the thermoplastic polymer composition layer (Y) is not particularly limited with respect to a preparation method thereof, it may be prepared by any methods so long as the aforementioned components can be uniformly mixed, and usually, a melt kneading method is adopted. The melt kneading can be, for example, performed by using a melt kneading device, such as a single-screw extruder, a biaxial extruder, a kneader, a batch mixer, a roller, and a Banbury mixer. Usually, the thermoplastic polymer composition can be obtained by performing melt kneading preferably at 170 to 270° C.

In the thus obtained thermoplastic polymer composition, a melt flow rate (MFR) measured under conditions at a temperature of 230° C. under a load of 2.16 kg (21.2 N) by a method in conformity with JIS K7210 is preferably in a range of 1 to 50 g/10 min, more preferably 1 to 30 g/10 min, and still more preferably 1 to 20 g/10 min. When the MFR falls within this range, favorable molding processability is obtained, and the preparation of the thermoplastic polymer composition layer (Y) becomes easy.

An adhesive force of the thermoplastic polymer composition is preferably 15 N/25 mm or more, more preferably 30 N/25 mm or more, and still more preferably 60 N/25 mm or more in the compression molding method (molding temperature: 230° C., compression time: 5 minutes). It is suitable that the thermoplastic polymer composition has low tackiness at normal temperature and does not exhibit an adhesive force at that temperature. Here, the adhesive force is a value measured in conformity with JIS K6854-2.

<MFR Ratio of Thermoplastic Polymer Composition Layer (Y) to Intermediate Layer (X)>

A ratio of {MFR (Y)/MFR (X)} of MFR of the thermoplastic polymer composition layer (Y) to MFR of the intermediate layer (X), as measured under conditions at a temperature of 230° C. under a load of 2.16 kg (21.2 N) by the method in conformity with JIS K7210, is preferably in a range of 1 to 15 from a reason of production as mentioned later.

<Decorative Layer (Z)>

As the decorative layer (Z), a resin film, a nonwoven fabric, an artificial leather, a natural leather, and so on can be used. Above all, the decorative layer (Z) is especially preferably one having at least a layer composed of a resin film.

Examples of the resin constituting the resin film include a polyolefin-based resin, a polystyrene resin, a polyvinyl chloride resin, an acrylonitrile styrene resin, an acrylonitrile butadiene styrene resin, a polycarbonate resin, a (meth)acrylic resin, a polyester resin, such as polyethylene terephthalate (PET) and polybutylene terephthalate, a polyamide, such as nylon 6, nylon 66, and a polyamide elastomer, polyvinyl chloride, polyvinylidene chloride, polyvinyl alcohol, an ethylene-vinyl alcohol copolymer, polyacetal, polyvinylidene fluoride, and polyurethane. Above all, a (meth)acrylic resin is preferred from the viewpoint of transparency, weather resistance, surface glossiness, and scratch resistance. Such a (meth)acrylic resin is more preferably a (meth)acrylic resin containing a methacrylic resin and an elastic body.

Although the thickness of the decorative layer (Z) is not limited at all, from the viewpoint of molding processability and economy, the decorative layer (Z) is preferably thin.

Methacrylic Resin

The methacrylic resin has a structural unit derived from methyl methacrylate in an amount of preferably 80% by mass or more, and more preferably 90% by mass or more. In other words, the methacrylic resin has a structural unit derived from a monomer other hand methyl methacrylate in an amount of preferably 20% by mass or less, and more preferably 10% by mass or less, and the methacrylic resin may be a polymer composed of only methyl methacrylate as the monomer.

The methacrylic resin is not particularly limited with respect to a production method thereof, and it is obtained through polymerization of a monomer (mixture) containing 80% by mass or more of methyl methacrylate or copolymerization with other monomer than methyl methacrylate. In addition, a commercially available product may also be used as the methacrylic resin. Examples of such a commercially available product include "PARAPET H1000B" (MFR: 22 g/10 min (230° C., 37.3 N)), "PARAPET GF" (MFR: 15 g/10 min (230° C., 37.3 N)), "PARAPET EH" (MFR: 1.3 g/10 min (230° C., 37.3 N)), "PARAPET HRL" (MFR: 2.0 g/10 min (230° C., 37.3 N)), "PARAPET HRS" (MFR: 2.4 g/10 min (230° C., 37.3 N)), and "PARAPET G" (MFR: 8.0 g/10 min (230° C., 37.3 N)) (all of which are a trade name, manufactured by Kuraray Co., Ltd.).

Elastic Body

Examples of the elastic body include a butadiene-based rubber, a chloroprene-based rubber, a block copolymer, and a multilayered structure, and these may be used either alone or in combination. Of these, from the viewpoint of transparency, impact resistance, and dispersibility, a block copolymer or a multilayered structure is preferred, and an acrylic block copolymer or a multilayered structure is more preferred.

The acrylic block copolymer has a methacrylic acid ester polymer block and an acrylic acid ester polymer block. The block copolymer may have only one of each of a methacrylic acid ester polymer block and an acrylic acid ester polymer block or may have a plural number of each of them.

[Multilayered Structure]

The multilayered structure has at least two layers of an inner layer and an outer layer and has at least one layer structure in which the inner layer and the outer layer are arranged in this order from the central layer toward the outermost layer direction. The multilayered structure may further have a crosslinkable resin layer in the inside of the inner layer or the outside of the outer layer.

The inner layer is a layer constituted of a crosslinked elastic body obtained through copolymerization of a monomer mixture of an acrylic acid alkyl ester and a crosslinkable monomer.

As such an acrylic acid alkyl ester, an acrylic acid alkyl ester in which the carbon number of the alkyl group ranges from 2 to 8 is preferably used, and examples thereof include butyl acrylate and 2-ethylhexyl acrylate. A ratio of the acrylic acid alkyl ester in the mixture of all of the monomers to be used for forming a copolymer of the inner layer is in a range of preferably 70 to 99.8% by mass, and more preferably 80 to 90% by mass from the viewpoint of impact resistance.

Although a method for producing the multilayered structure is not particularly limited, from the viewpoint of controlling a layer structure of the multilayered structure, it is preferred to produce the multilayered structure through emulsion polymerization.

Constitution of Decorative Layer (Z)

In the case where the (meth)acrylic resin constituting the decorative layer (Z) contains the methacrylic resin and the elastic body, as for the content of each of the components, it is preferred that the content of the methacrylic resin is 10 to 99 parts by mass, and the content of the elastic body is 90 to 1 part by mass, based on 100 parts by mass of the sum total of the methacrylic resin and the elastic body. When the content of the methacrylic resin is less than 10 parts by mass, the surface hardness of the decorative layer (Z) is liable to be lowered. It is more preferred that the content of the methacrylic resin is 55 to 90 parts by mass, and the content of the elastic body is 45 to 10 parts by mass, based on 100 parts by mass the sum total of the methacrylic acid and the elastic body. It is still more preferred that the content of the methacrylic resin is 70 to 90 parts by mass, and the content of the elastic body is 30 to 10 parts by mass.

The (meth)acrylic resin may contain various additives, for example, an antioxidant, a thermostabilizer, a lubricant, a processing aid, an antistatic agent, a thermal degradation inhibitor, an ultraviolet absorber, a photostabilizer, a polymer processing aid, a colorant, and an impact resistance aid.

The resin serving as the raw material of the resin film is not particularly limited with respect to a preparation method thereof, and though it may be prepared by any methods so long as the aforementioned components may be uniformly mixed, a method of mixing by means of melt kneading is preferred.

The decorative layer (Z) may be colored. Examples of a coloration method include a method in which a pigment or a dye is contained in the resin per se constituting the resin film, thereby coloring the resin per se before being formed into a film; and a dyeing method in which the resin film is dipped in a liquid having a dye dispersed therein to achieve coloration, but the coloration method is not particularly limited thereto.

The decorative layer (Z) is subjected to printing. By printing, a pattern, such as a design, a letter, and a figure, and a color, is given. The pattern may be of a chromatic color or may be of an achromatic color. In order to prevent fading of the printing layer, the printing may be applied onto the side coming into contact with the thermoplastic polymer composition layer (Y).

The decorative layer (Z) may be subjected to vapor deposition. For example, a metallic tone and a gloss are given by means of indium vapor deposition. The vapor deposition may be applied onto the side coming into contact with the thermoplastic polymer composition layer (Y).

In the case of using a (meth)acrylic resin film for the decorative layer (Z), the surface thereof is preferably HB or harder, more preferably F or harder, and still more preferably H or harder in terms of a JIS pencil hardness (thickness: 75 µm). By using the (meth)acrylic resin film having a hard surface for the decorative layer (Z), the decorative layer (Z) is hardly scratched, and therefore, it is suitably used as a decorative and protective film for a surface of a molded article for which designability is required.

<Production Method of Multilayered Film>

As for a method for producing the multilayered film of the present invention, the production method is not particularly limited so long as it is a molding method in which the multilayered film can be produced in such a manner that it has the thermoplastic polymer composition layer (Y) on the both surfaces of the intermediate layer (X), the decorative layer (Z) is arranged on either one of the intermediate layers (Y), and these are laminated in the order of (Y)-(X)-(Y)-(Z). Examples thereof include an extrusion coating method, a solution coating method, an extrusion lamination method, a coextrusion method, a thermal lamination method, and a contact bonding method. In particular, a method in which a multilayered film of a (Y)-(X)-(Y) configuration is produced by the coextrusion method, and the decorative layer (Z) is stuck by the thermal lamination method to form the (Y)-(X)-(Y)-(Z) configuration is preferred from the viewpoint of process-simplification and production costs. The coextrusion method as one example of the production method is hereunder described in detail.

The film having the thermoplastic polymer composition layer (Y) on the both surfaces of the intermediate layer (X) is produced by a coextrusion molding method of laminating the intermediate layer (X) and a melt of the thermoplastic polymer composition layer (Y) in a die. The coextrusion molding method can be performed by a known method, such as a T-die method and an inflation method. Examples of the T-die method include a multi-manifold method and a feed block method. In particular, from the viewpoint of thickness accuracy, coextrusion molding by the multi-manifold method is preferred. From the viewpoint that after coextrusion molding, a film with favorable surface smoothness is obtained, a method including steps of extruding a melt kneaded material in a molten state from a T-die and bringing one surface thereof into contact with a cast roll surface to undergo molding is preferred. It is preferred that the side of the opposite surface is brought into contact with a touch roll such that the molten resin comes into intimate contact with the cast roll. As for the caster roll to be used on this occasion, it is preferred that its surface is made of a hydrophobic resin. Examples of the hydrophobic resin include a silicone resin and a fluorine-based resin. Specifically, for example, there is exemplified a mode in which a silicone rubber having a thickness of 3 to 5 mm is wound around the roll surface. The silicon rubber preferably has a hardness of 60 to 90A. In addition, in another example, there is exemplified a mode in which a fluorine-based surface processing agent is coated on a surface of a metal roll, thereby providing a fluorine-based resin layer on the surface. In the case where the cast roll surface is made of a metal and is a mirror surface, it is difficult to release the coextruded film from the cast roll. As a result, it occasionally becomes difficult to produce the film.

From the viewpoint of taking-up stability of the film during coextrusion molding, the MFR ratio (Y)/(X) of the thermoplastic polymer composition layer (Y) to the intermediate layer (X) at a temperature of 230° C. under a load of 2.16 kg (21.2 N) is preferably 1 to 15, and more preferably 3 to 15. When the MFR ratio is smaller than 1, there is a case where destabilization in the film thickness and width is caused.

Subsequently, by sticking the decorative layer (Z) on the laminated film having the intermediate layer (X) and the thermoplastic polymer composition layer (Y) by means of thermal lamination with two heat rolls, the multilayered film can be obtained. The thermal lamination method is not particularly limited.

A thickness T(X) of the intermediate layer (X) is preferably 400 μm or less. When the thickness is more than 400 μm, secondary processability, such as lamination properties, handling properties, and cutting and punching properties, is lowered. Thus, not only it becomes difficult to use the film as the multilayered film, but also a unit cost per unit area increases, resulting in disadvantage from the standpoint of economy, and hence, such is not preferred. The thickness of the intermediate layer (X) is more preferably 50 to 300 μm, and especially preferably 100 to 250 μm.

A thickness T(Y) of the thermoplastic polymer composition layer (Y) is preferably 500 μm or less. When the thickness is thicker than 500 μm, not only secondary processability, such as lamination properties, handling properties, and cutting and punching properties, is lowered, but also a unit cost per unit area increases, resulting in disadvantage from the standpoint of economy, and hence, such is not preferred. The thickness of the thermoplastic polymer composition layer (Y) is preferably 10 to 200 μm, more preferably 30 to 150 μm, and especially preferably 50 to 150 μm.

A thickness ratio T(Y)/T(X) of the thermoplastic polymer composition layer (Y) to the intermediate layer (X) is preferably 0.4 to 1.5. When the foregoing thickness ratio falls within the aforementioned range, the adhesive strength between the thermoplastic polymer composition layer (Y) and the intermediate layer (X) or the thermoplastic polymer composition layer (Y) and the decorative layer (Z) is excellent, and the handling properties at the time of molding processing are favorable.

An entire thickness of the multilayered film of the present invention is preferably less than 1,000 μm. When the thickness of the multilayered film is less than 1,000 μm, on producing a molded product as mentioned later, coating moldability on an article having a three-dimensional curved surface is excellent, and molding processing is readily undergone. The thickness of the multilayered film is more preferably 600 μm or less. On the other hand, when the thickness is less than 50 μm, there is a case where shape retention properties of the film are small, and decorative molding is difficult to be undergone.

[Molded Product]

The molded product of the present invention is a molded product in which the multilayered film of the present invention is coated on an adherend having a three-dimensional surface, or a molded product prepared by inserting the multilayered film of the present invention or a preformed molded body of the foregoing film into an injection mold and integrally molding with an adherend through injection molding, and is characterized by being adhered via the thermoplastic polymer composition layer (Y) in the multilayered film. The adherend is preferably one composed of a polyolefin-based resin, an ABS resin, or a PC/ABS resin.

[Production Method of Molded Product]

A production method of the molded product of the present invention is not particularly limited so long as the multilayered film of the present invention adheres and coats the surface of the adherend having a three-dimensional curved surface. For example, the molded product can be obtained by adhering the multilayered film of the present invention onto the surface of the adherend having a three-dimensional curved surface by means of vacuum molding, pressure molding, vacuum pressure molding, or compression molding under heating. In addition, for example, the molded product having a surface having a three-dimensional curved surface decorated thereon can be obtained by adhering the multilayered film of the present invention to a sheet-like adherend by an already-known method, such as thermal lamination, followed by performing vacuum molding, pressure molding, or compression molding under heating.

In addition, for example, the molded product having a surface having a three-dimensional curved surface decorated thereon can be obtained by inserting the multilayered film of the present invention or a preformed molded body of the foregoing film into an injection mold, followed by performing injection molding. This is a method generally called a film insert injection molding method.

[Application]

The multilayered film of the present invention and the molded product in which the foregoing multilayered film is laminated on an adherend can be suitably applied for articles used suitably for decoration in which the designability is required. Examples of such an article include signboard components, such as an advertising pillar, a stand signboard, a side signboard, a transom signboard, and a rooftop signboard; display components, such as a showcase, a divider panel, and a store display; illumination components, such as a fluorescent lamp cover, a mood lighting cover, a lamp shade, a luminous ceiling, a luminous wall, and a chandelier; interior design components, such as furniture, a pendant, and a mirror; construction components, such as a door, a dome, a safety window glass, a partition, a staircase wainscot, a balcony wainscot, and a roof of a leisure building; transportation-related components, such as an automobile interior or exterior member and an automobile exterior member, e.g., a bumper; electronics components, such as a nameplate for an audiovisual system, a stereo cover, a vending machine, a cellular phone, and a personal computer; an incubator, a ruler, a dial, a greenhouse, a large-sized tank, a box water tank, a bathroom member, a clock panel, a bath tub, a sanitary, a desk mat, a gaming machine component, a toy, and a wallpaper; a marking film; and various household appliances.

EXAMPLES

The present invention is hereunder described in more detail by reference to Examples and so on, but it should be construed that the present invention is by no means limited by these Examples. Preparations of test samples and measurements or evaluations of respective physical properties in the Examples and Comparative Examples were performed in the following manners, and the results are summarized in the table.

The respective components used in the present Examples and Comparative Examples are as follows.

[Multilayered Film]

<Intermediate Layer (X)>

The following resins were used for the intermediate layer (X).

Polypropylene-based resin (X-1); Polypropylene-based resin CALP-E4361-1 (talc blended, melting point=125° C., heat of fusion=404 mJ, degree of crystallinity=27 (value in terms of a polypropylene matrix), MFR=0.9 g/10 min, tensile elastic modulus E at 23° C.=2,960,000 kPa)

Polypropylene-based resin (X-2); Polypropylene-based resin NOVATEC EG7FTB (polypropylene-ethylene random copolymer, melting point=149° C., heat of fusion=437 mJ, degree of crystallinity=28, MFR=1.5 g/10 min, tensile elastic modulus E at 23° C.=1,150,000 kPa)

Polypropylene-based resin (X-3); Polypropylene-based resin NOVATEC EC9 (block polypropylene, melting point=164° C., heat of fusion=498 mJ, degree of crystallinity=30, MFR=0.9 g/10 min, tensile elastic modulus E at 23° C.=1,200,000 kPa)

Polypropylene-based resin (X-4); Polypropylene-based resin NOVATEC MA3 (homopolypropylene, melting point=166° C., heat of fusion=780 mJ, degree of crystallinity=40, MFR=13 g/10 min, tensile elastic modulus E at 23° C.=1,600,000 kPa)

(Meth)acrylic resin (X-5); (Meth)acrylic resin obtained in the following Production Example 2 (glass transition point=128° C., MFR=3.4 g/10 min, tensile elastic modulus E at 23° C.=1,540,000 kPa)

(X-1) is manufactured by Lion Idemitsu Composites Co., Ltd.; (X-2), (X-3), and (X-4) are manufactured by Japan Polypropylene Corporation; and (X-5) is a (meth)acrylic resin obtained in the following Production Example 2. All of the aforementioned MFR's are a value measured under conditions at a temperature of 230° C. under a load of 2.16 kg (21.2 N).

<Thermoplastic Polymer Composition Layer (Y)>

The following were used as the thermoplastic polymer composition layer (Y).

A thermoplastic polymer composition layer (Y-1) is a composition described in Production Example 1 using a thermoplastic elastomer (A-1) produced in the following Synthesis Example 1, and its storage elastic modulus under a condition at 120° C. was 1,750 kPa. In addition, its tensile elastic modulus E at 23° C. was 58,300 kPa.

A thermoplastic elastomer (Y-2) is a thermoplastic elastomer (A-1) produced in the following Synthesis Example 1, and its storage elastic modulus under a condition at 120° C. was 828 kPa. In addition, its tensile elastic modulus E at 23° C. was 13,480 kPa.

<Decorative Layer (Z)>

A (meth)acrylic resin (Z-1) obtained in the following Production Example 2 was used as the decorative layer (Z).

[Adherend]

A material composed of the following resin was used as the adherend.

Polyolefin-based resin: Polypropylene-base resin NOVATEC MA3 (manufactured by Japan Polypropylene Corporation)

ABS-based resin: KRALASTIC MTH2 (manufactured by Nippon A&L Inc.)

Respective physical properties in the Examples and Comparative Examples were measured or evaluated by the following methods.

[Weight Average Molecular Weight (Mw) and Molecular Weight Distribution (Mw/Mn)]

A weight average molecular weight expressed in terms of standard polystyrene was determined by means of gel permeation chromatography (GPC).

Apparatus: GPC apparatus "HLC-8020", manufactured by Tosoh Corporation

Separation Column: "TSKgel GMHXL", "G4000HX", and "G5000HXL", all of which are manufactured by Tosoh Corporation, are serially connected to each other.

Eluent: Tetrahydrofuran

Flow rate of eluent: 1.0 mL/min

Column temperature: 40° C.

Detection method: Differential refractive index (RI)

[Content of Polymer Block (a1) and Vinyl Bond Amount (1,2-Bond Amount and 3,4-Bond Amount) of Polymer Block (a2) in Thermoplastic Elastomer (A)]

Determination was performed by means of $^1$H-NMR measurement.

Apparatus: Nuclear magnetic resonance apparatus "Lambda-500" (manufactured by JEOL Ltd.)

Solvent: Deuterated chloroform

[Melting Point/Heat of Fusion]

Each of the aforementioned intermediate layer resins was measured with a differential scanning calorimeter (DSC30, manufactured by METTLER TOLEDO) in a nitrogen atmosphere by a temperature rise method: 25° C.→190° C.→25° C.→190° C. (rate: 10° C./min). The evaluation was carried out in the 2nd-Run, and the melting point was calculated from an endothermic peak temperature in a melting curve, whereas an endothermic peak area was calculated from a heat of fusion.

[MFR]

Each of the resins was measured with an MFR measuring device (MELT INDEXER L244, manufactured by TAKARA) under conditions at a measuring temperature of 230° C. under a measuring load of 2.16 kg (21.2 N) in conformity of JIS K7210.

[Storage Elastic Modulus]

With respect to the thermoplastic polymer composition (Y), pellets were formed in a film having a width of 5 mm, a length of 30 mm, and a thickness of 75 μm by means of press molding, and the storage elastic modulus was measured with a dynamic viscoelastometer (DVE-V4 FT Rheospectoler, manufactured by Rheology Co., Ltd.) in a temperature dependence mode at a frequency of 1 Hz.

[Bending Rigidity]

The bending rigidity K in the present invention was defined according to the following formula.

$$K=(E \times h^3)/12 \text{ [unit: kPa·mm}^3\text{]}$$

Here, E is a tensile elastic modulus at 23° C., and h is a film thickness. One obtained by multiplying the bending rigidity K by a film width b is the bending rigidity of a film with a thickness h having an optional width b.

[Coextrusion Film Formability of Intermediate Layer (X) and Thermoplastic Polymer Composition Layer (Y)]

In each of the Examples and Comparative Examples, resin pellets constituting the intermediate layer (X) and resin pellets constituting the thermoplastic polymer composition layer (Y) were separately input in hoppers of a single-screw extruder (VGM25-28EX, manufactured by G.M. ENGINEERING) and coextruded by a multi-manifold die, to obtain a two-layer film having a width of 300 mm and a thickness of 325 μm. At this time, coextrusion film formability was evaluated according to the following criteria through visual observation of the presence or absence of the thickness variation of the film and pulsation of edges.

A: No problem in film appearance and possible for achieving film formation.

B: Problems were found in film appearance (thickness variation or pulsation found) and impossible for achieving film formation.

[Adhesive Strength Between Thermoplastic Polymer Composition Layer (Y) and Intermediate Layer (X)]

Similar to the aforementioned evaluation of coextrusion film formability, with respect to the prepared multilayered films, the peel strength (N/25 mm) between the thermoplastic polymer composition layer (Y) and the intermediate layer (X) in the multilayered film was evaluated according to the following criteria by using a desktop precision universal tester (AGS-X, manufactured by Shimadzu Corporation) in conformity with JIS K6854-2 under conditions at a peel angle of 90°, at a tensile speed of 300 mm/min, and at an ambient temperature of 23° C.

AA: Material breakage
A: Firmly adhered
B: Peel is found

[Adhesive Strength Between Thermoplastic Polymer Composition Layer (Y) and Decorative Layer (Z) (Thermal Lamination)]

Similar to the following evaluation of coextrusion film formability, multilayered films were prepared.

Subsequently, the resin film constituting the decorative layer (Z) and the aforementioned multilayered film were stuck to each other by means of thermal lamination by passing between heat rolls of 120° C. and 40° C. in such a state that the protective film was stuck on one surface thereof by using a thermal lamination device (Type VAII-700, manufactured by Taisei Laminator Co., Ltd.). At this time, the side of the resin film constituting the decorative layer (Z) was positioned on the side of the roll of 120° C. The resulting multilayered film was cut out and notched with a cross-cutting tool in conformity with JIS K5400, to prepare a pattern of 100 squares (1 mm in length×1 mm in width). A cellophane adhesive tape (manufactured by Nichiban Co., Ltd.) was pressed thereon in an environment at 25° C. and 50% RH and then lifted up in a direction of 90°, thereby evaluating the peel strength according to the following criteria.

A: No peel
B: Peel is found

[Handling Properties of Multilayered Film During Preform Molding]

In a vacuum chamber box of a vacuum pressure molding machine (NGF0406 molding machine, manufactured by Fu-se Vacuum Forming Ltd.), the multilayered film (210 mm in length×297 in width) obtained by the aforementioned thermal lamination was inserted such that the decorative layer (Z) was positioned on the opposite side to a convex-form die (250 mm in length×160 mm in width×25 mm in height) placed on a stage, and thereafter, the film was heated to 110° C. under vacuum and pressurized by setting the pressure in the chamber box to 0.3 kPa. In this manner, the three-dimensional overlay method (TOM molding) was performed to shape the multilayer film into a box form, and the handling properties during preform molding were evaluated according to the following criteria. In the case where the thermoplastic polymer composition layer (Y) came into direct contact with the die, the molding was performed in a state that the protective layer was stuck.

A: Molding can be performed without problems.
B: Problems are found in molding (film warpage or wrinkle, or defective shaping is found).

[Die Setting Properties During Insert Injection Molding of Preformed Molded Product]

Setting properties on the occasion of housing the aforementioned preformed molded product in the die of a direct-pressure hydraulic molding machine (M-100C-AS-DM, manufactured by Meiki Co., Ltd.) were evaluated according to the following criteria.

A: The preformed molded product can be set in the die without problem and can be molded.
B: The setting properties in a die are problematic (dropping from the die and turning around of the injection molding resin).

[Adhesive Strength Between Multilayered Film and Adherend (Vacuum Molding)]

In the aforementioned vacuum molding, a plate-form adherend made of the aforementioned polyolefin-based resin or ABS resin was placed in place of the convex-form die, and vacuum molding was performed to obtain a sample for measuring adhesive strength. The side of the polyolefin resin or ABS resin of the sample obtained was immobilized with a strong pressure-sensitive adhesive tape (Hyper Joint H9004, manufactured by Nitto Denko Corporation) onto a board of stainless steel (SUS). Then, the peel strength (N/25 mm) between the thermoplastic polymer composition layer (Y) in the multilayered film and the sample made of the polyolefin resin or ABS resin as the adherend was measured by using a desktop precision universal tester (AGS-X, manufactured by Shimadzu Corporation) in conformity with JIS K6854-2 under conditions at a peel angle of 90°, at a tensile speed of 300 mm/min, and at an ambient temperature of 23° C., and the adhesive strength (N/25 mm) of the multilayered film to the adherend in the vacuum molded product was evaluated according to the following criteria.

AA: Material breakage
A: Firmly adhered
B: Peel is found

[Adhesive Strength Between Multilayered Film and Adherend (Injection Molding)]

Using the multilayered film obtained by the aforementioned thermal lamination and the polyolefin-based resin or ABS resin, the multilayered film was housed in a die of a direct-pressure hydraulic molding machine (M-100C-AS-DM, manufactured by Meiki Co., Ltd.), a movable half and a cavity side part were clamped, and a molten resin of the polyolefin resin was injected into cavity at 230° C., or the ABS rein was injected into the cavity at 260° C. There was thus produced a molded product having the multilayered film laminated thereon, in which the polyolefin resin or the ABS resin served as the adherend. With respect to the physical properties of the thus obtained molded product having the multilayered film laminated thereon, the peel strength was evaluated according to the following criteria by using the aforementioned desktop precision universal tester.

AA: Material breakage
A: Firmly adhered
B: Peel is found

<Synthesis Example 1>[Thermoplastic Elastomer (A-1)]

In a pressure-resistant vessel which had been replaced with nitrogen and dried, 64 L of cyclohexane as a solvent, 0.20 L of sec-butyllithium (10% by mass cyclohexane solution) as an initiator, and 0.3 L of tetrahydrofuran as an organic Lewis base were charged. After raising the temperature to 50° C., 2.3 L of styrene was added, and the contents were polymerized for 3 hours. 23 L of isoprene was uninterruptedly added, and the contents were polymerized for 4 hours. 2.3 L of styrene was further added, and the contents were polymerized for 3 hours. The obtained reaction liquid was poured into 80 L of methanol, and a deposited solid was separated by means of filtration and dried at 50° C. for 20 hours, to obtain a triblock copolymer composed of polystyrene-polyisoprene-polystyrene. Subsequently, 10 kg of the triblock copolymer composed of polystyrene-polyisoprene-polystyrene was dissolved in 200 L of cyclohexane, palladium carbon (palladium supporting amount: 5% by mass) as a hydrogenation catalyst was added in an amount of 5% by mass relative to the copolymer, and a reaction was performed for 10 hours under conditions at a hydrogen pressure of 2 MPa and at 150° C. After allowing to stand for cooling and pressure releasing, the palladium carbon was removed by means of filtration, and a filtrate was concentrated and further vacuum dried, to obtain a hydrogenated product of a triblock copolymer composed of polystyrene-polyisoprene-polystyrene (hereinafter referred to as "thermoplastic elastomer (A-1)"). The obtained thermoplastic elastomer (A-1) had a weight average molecular weight of 107,000, a styrene content of 21% by mass, a hydrogenation rate of 85%, a molecular weight distribution of 1.04, and a sum total of a 1,2-bond and a 3,4-bond contained in the polyisoprene block of 60 mol %.

<Synthesis Example 2>[Polar Group-Containing Polypropylene-based Resin (B-1)]

42 kg of polypropylene (Prime Polypro F327, manufactured by Primer Polymer Co., Ltd.), 160 g of maleic anhydride, and 42 g of 2,5-dimethyl-2,5-di(tert-butylperoxy) hexane were melt kneaded with a batch mixer under conditions at 180° C. and a screw rotation number of 40 rpm, to obtain a polar group-containing polypropylene-based resin (B-1). The polar group-containing polypropylene-based resin (B-1) had an MFR at a temperature of 230° C. under a load of 2.16 kg (21.2 N) of 6 g/10 min, a maleic anhydride concentration of 0.3%, and a melting point of 138° C. The maleic anhydride concentration is a value obtained through titration with a methanol solution of potassium hydride. In addition, the melting point is a value determined from an endothermic peak of a differential scanning calorimetry curve on the occasion of temperature rise at a rate of 10° C./min.

<Synthesis Example 3>[Methacrylic Resin (F-1)]

To a monomer mixture composed of 95 parts by mass of methyl methacrylate and 5 parts by mass of methyl acrylate, 0.1 parts by mass of a polymerization initiator ((2,2'-azobis (2-methylpropionitrile), hydrogen abstraction ability: 1%, one-hour half-life temperature: 83° C.) and 0.28 parts by mass of a chain transfer agent (n-octyl mercaptan) were added and dissolved to obtain a raw material liquid. In addition, 100 parts by mass of ion exchange water, 0.03 parts by mass of sodium sulfate, and 0.45 parts by mass of a suspension dispersant were mixed in another vessel, to obtain a liquid mixture. In a pressure-resistant polymerization tank, 420 parts by mass of the aforementioned liquid mixture and 210 parts by mass of the aforementioned raw material liquid were charged, and a polymerization reaction was commenced in a nitrogen atmosphere with stirring at a temperature of 70° C. After elapsing 3 hours after commencement of the polymerization reaction, the temperature was raised to 90° C., and the stirring was uninterruptedly performed for 1 hour, to obtain a liquid having a beaded copolymer dispersed therein. The obtained copolymer dispersion liquid was washed with an appropriate amount of ion exchange water, and the beaded copolymer was taken out by a bucket type centrifuge and dried for 12 hours by a hot air dryer at 80° C., to obtain a beaded methacrylic resin (F-1) having a weight average molecular weight Mw(F) of 30,000 and a Tg of 128° C.

<Synthesis Example 4>[Multilayered Structure (E-1)]

In a reactor equipped with a stirrer, a thermometer, a nitrogen gas introducing pipe, a monomer introducing pipe, and a reflex condenser, 1,050 parts by mass of ion exchange water, 0.5 parts by mass of sodium dioctylsulfosuccinate, and 0.7 parts by mass of sodium carbonate were charged, and after thoroughly replacing the inside of the vessel with a nitrogen gas, the inner temperature was set to 80° C. 0.25 parts by mass of potassium persulfate was put thereinto, and the contents were stirred for 5 minutes. 245 parts by mass of a monomer mixture composed of methyl methacrylate/ methyl acrylate/allyl methacrylate=94/5.8/0.2 (mass ratio) was then continuously dropped over 50 minutes, and after completion of dropping, a polymerization reaction was further performed for 30 minutes.

Subsequently, 0.32 parts by mass of potassium peroxodisulfate was put into the same reactor, and the contents were stirred for 5 minutes. 315 parts by mass of a monomer mixture composed of 80.6% by mass of butyl acrylate, 17.4% by mass of styrene, and 2% by mass of allyl methacrylate was then continuously dropped over 60 minutes, and after completion of dropping, a polymerization reaction was further performed for 30 minutes.

Subsequently, 0.14 parts by mass of potassium peroxodisulfate was put into the same reactor, and the contents were stirred for 5 minutes. 140 parts by mass of a monomer mixture composed of methyl methacrylate/methyl acrylate=94/6 (mass ratio) was then continuously dropped over 30 minutes, and after completion of dropping, a polymerization reaction was further performed for 60 minutes, to obtain a multilayered structure (E-1).

<Production Example 1>[Thermoplastic Polymer Composition (Y-1)]

80 parts by mass of the thermoplastic elastomer (A-1) obtained in Synthesis Example 1 and 20 parts by mass of the polar group-containing polypropylene-based resin (B-1) obtained in Synthesis Example 2 were melt kneaded at 230° C. with a biaxial extruder (TEM-28, manufactured by Toshiba Machine Co., Ltd.; the same in all of the following Production Examples) and then extruded in a strand form, followed by cutting to produce pellets of a thermoplastic polymer composition (Y-1). The resin had an MFR of 7.4 g/10 min.

<Production Example 2>[(Meth)acrylic Resin (X-5, Z-1)]

88 parts by mass of the methacrylic resin (F-1) obtained in Synthesis Example 3 and 20 parts by mass of the multilayered structure (E-1) obtained in Synthetic Example 4 were melt kneaded at 230° C. with a biaxial extruder and then extruded in a strand form, followed by cutting to obtain pellets of a (meth)acrylic resin (X-5, Z-1) having a Tg of 129° C.

Example 1

The pellets of the thermoplastic polymer composition (Y-1) obtained in Production Example 1 and the pellets of the intermediate layer resin (X-1) were separately input in hoppers of a single-screw extruder (VGM25-28EX, manufactured by G.M. ENGINEERING) and coextruded by a multi-manifold die, to obtain a two-kind three-layer film having a width of 300 mm and a thickness of 300 µm. The thickness of each of the layers was controlled by an extrusion flow rate, to set the thickness of the thermoplastic polymer composition (Y-1) to 50 µm and the thickness of the intermediate layer resin (X-1) to 200 µm, respectively. Here, the thermoplastic polymer composition (Y-1) layer had low tackiness at normal temperature and was not adhered at that temperature.

Separately, using the pellets of the (meth)acrylic resin (Z-1) obtained in Production Example 2, a (meth)acrylic resin film (thickness; 75 µm) was obtained by using a single-screw extruder and a T-die for single layer.

Subsequently, the two-layer film obtained above and the (meth)acrylic resin film were subjected to thermal lamination, to produce a multilayered film having a three-kind four-layer structure. The (meth)acrylic resin film constituting the decorative layer (Z) and the aforementioned two-kind three-layer film were stuck to each other by means of thermal lamination by passing between heat rolls of 120° C. and 40° C. such that the resin film was arranged on the side of the thermoplastic polymer composition layer (Y) by using a thermal lamination device (Type VAII-700, manufactured by Taisei Laminator Co., Ltd.). At this time, the protective film was stuck on one surface of the thermoplastic polymer composition layer, and the side of the (meth)acrylic resin film was positioned on the roll side of 120° C.

Subsequently, using the multilayered film as obtained above and the polyolefin-based resin or ABS resin, the multilayered film was housed in a die of a direct-pressure hydraulic molding machine (M-100C-AS-DM, manufactured by Meiki Co., Ltd.), a movable half and a cavity side part were clamped, and a molten resin of the polyolefin resin was injected into the cavity at 230° C., or the ABS rein was injected into the cavity at 260° C. There was thus produced a molded product having the multilayered film laminated thereon, in which the polyolefin resin or the ABS resin served as the adherend. Prior to housing the multilayered film in the die, preforming in a shape analogous to the die shape was performed at 130° C.

The physical properties of the obtained multilayered film and the molded product having the multilayered film laminated thereon were evaluated according to the aforementioned methods. The results are shown in Table 1.

Example 2

A multilayered film and a molded product were obtained in the same manner as in Example 1, except that in Example 1, the thickness of the polypropylene-based resin (X-1) of the intermediate layer was changed to 150 µm. The results are shown in Table 1.

Example 3

A multilayered film and a molded product were obtained in the same manner as in Example 2, except that in Example 2, the polypropylene-based resin (X-2) was used in place of the polypropylene-based resin (X-1). The results are shown in Table 1.

Example 4

A multilayered film and a molded product were obtained in the same manner as in Example 2, except that in Example 2, the polypropylene-based resin (X-3) was used in place of the polypropylene-based resin (X-1). The results are shown in Table 1.

Example 5

A multilayered film and a molded product were obtained in the same manner as in Example 2, except that in Example 2, the (meth)acrylic resin (X-5) was used in place of the polypropylene-based resin (X-1) of the intermediate layer. The results are shown in Table 1.

Example 6

A multilayered film and a molded product were obtained in the same manner as in Example 1, except that in Example 2, the thermoplastic polymer composition (Y-2) was used in place of the thermoplastic polymer composition (Y-1). The results are shown in Table 1. Here, the thermoplastic polymer composition (Y-2) layer had low tackiness at normal temperature and was not adhered at that temperature.

Example 7

A multilayered film and a molded product were obtained in the same manner as in Example 2, except that in Example 2, the polypropylene-based resin (X-4) was used in place of the polypropylene-based resin (X-1) of the intermediate layer. The results are shown in Table 1.

Example 8

A multilayered film and a molded product were obtained in the same manner as in Example 3, except that in Example 3, the thickness of the polypropylene-based resin (X-2) of the intermediate layer was changed to 85 µm. The results are shown in Table 1.

Example 9

A multilayered film and a molded product were obtained in the same manner as in Example 3, except that in Example 3, the thickness of the polypropylene-based resin (X-2) of the intermediate layer was changed to 500 µm. The results are shown in Table 1.

Example 10

A multilayered film and a molded product were obtained in the same manner as in Example 1, except that in Example 1, the thickness of the polypropylene-based resin (X-1) of the intermediate layer was changed to 300 µm. The results are shown in Table 1.

Example 11

A multilayered film and a molded product were obtained in the same manner as in Example 3, except that in Example 3, the thickness of the polypropylene-based resin (X-2) of the intermediate layer was changed to 610 µm. The results are shown in Table 1.

Comparative Example 1

The pellets of the thermoplastic polymer composition (Y-1) obtained in Production Example 1 were each input in a hopper of a single-screw extruder (VGM25-28EX, manufactured by G.M. ENGINEERING) and extruded by a multi-manifold die, thereby attempting to obtain a single-layer film having a width of 300 mm and a thickness of 100 μm. However, the thermoplastic polymer composition layer (Y-1) was brought into excessively intimate contact with the metal roll surface and could not be released, so that the film was not obtained. Then, the thermoplastic polymer composition layer (Y-1) was prepared by means of compression molding (molding temperature: 230° C., compression time: 5 minutes) and evaluated with respect to the items except for the film formability. The results are shown in Table 1.

Comparative Example 2

It was attempted to obtain a single-layer film of the thermoplastic polymer composition (Y-2) in the same manner as in Comparative Example 2, except that in Comparative Example 2, the thermoplastic polymer composition (Y-2) was used in place of the thermoplastic polymer composition (Y-1). However, the thermoplastic polymer composition layer (Y-2) was brought into excessively intimate contact with the metal roll surface and could not be released, so that the film was not obtained. Then, the thermoplastic polymer composition layer (Y-2) was prepared by means of compression molding (molding temperature: 230° C., compression time: 5 minutes) and evaluated with respect to the items except for the film formability. The results are shown in Table 1.

Comparative Example 3

A multilayered film and a molded product were obtained in the same manner as in Example 1, except that in Example 1, the thickness of the polypropylene-based resin (X-1) of the intermediate layer was changed to 500 μm. The results are shown in Table 1.

Comparative Example 4

A multilayered film and a molded product were obtained in the same manner as in Example 3, except that in Example 3, the thickness of the polypropylene-based resin (X-2) of the intermediate layer was changed to 75 μm. The results are shown in Table 1.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Decorative layer (Z) | (Meth)acrylic acid (Z-1) [μm] | 75 | 75 | 75 | 75 | 75 | 75 | 75 | 75 |
| Thermoplastic polymer composition layer (Y) | Thermoplastic polymer composition (Y-1) [μm] | 50 | 100 | 100 | 100 | 100 | | 100 | 100 |
| | Thermoplastic elastomer (Y2) [μm] | | | | | | 100 | | |
| Intermediate layer (X) | PP-based resin (X-1) [μm] | 200 | 150 | | | | 150 | | |
| | PP-based resin (X-2) [μm] | | | 150 | | | | | 85 |
| | PP-based resin (X-3) [μm] | | | | 150 | | | | |
| | PP-based resin (X-4) [μm] | | | | | | | 150 | |
| | PMMA-based resin (X-5) [μm] | | | | | 150 | | | |
| Coextrusion film formability of thermoplastic polymer composition layer (Y) and intermediate layer (X) | | A | A | A | A | A | A | B | A |
| MFR ratio (Y)/(X) [g/10 min, at 230° C. and 2.16 kg] | | 8.2 | 8.2 | 4.9 | 9.3 | 2.2 | 14 | 0.57 | 4.9 |
| Adhesive strength between thermoplastic polymer composition layer (Y) and intermediate layer (X) (coextrusion molding) | | AA | AA | AA | AA | A | AA | AA | AA |
| Adhesive strength [N/25 mm] | | Broken | Broken | Broken | Broken | 15 | Broken | Broken | Broken |
| Handling properties during preforming of multilayered film (Z)/(Y)/(X)/(Y) | | A | A | A | A | A | A | A | A |
| Die setting properties during insert molding preformed article | | A | A | A | A | A | A | A | A |
| Bending rigidity of multilayered film [kPa · mm³] | | 2028 | 891 | 382 | 396 | 491 | 888 | 509 | 118 |
| Bending rigidity of intermediate layer (X) [kPa · mm³] | | 1973 | 833 | 323 | 338 | 432 | 833 | 450 | 60 |
| Adhesive strength between multilayered film and decorative layer (Z) (thermal lamination) | | A | A | A | A | A | A | A | A |
| Adhesive strength between multilayered film and polyolefin resin (vacuum molding) | | A | A | A | A | A | A | A | A |
| Adhesive strength [N/25 mm] | | 48 | 34 | 34 | 34 | 34 | 35 | 34 | 34 |
| Adhesive strength between multilayered film and ABS resin (vacuum molding) | | A | A | A | A | A | A | A | A |
| Adhesive strength [N/25 mm] | | 16 | 18 | 18 | 18 | 18 | 19 | 18 | 18 |
| Adhesive strength between multilayered film and polyolefin resin (injection molding) | | AA | AA | AA | AA | AA | AA | AA | AA |

TABLE 1-continued

|  |  |  |  |  |  |  |  |  |
|---|---|---|---|---|---|---|---|---|
| Adhesive strength [N/25 mm] | Broken | Broken | Broken | Broken | Broken | Broken | Broken | Broken |
| Adhesive strength between multilayered film and ABS resin (injection molding) | A | A | A | A | A | A | A | A |
| Adhesive strength [N/25 mm] | 25 | 27 | 27 | 27 | 27 | 28 | 27 | 27 |

|  |  | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|---|
| Decorative layer (Z) | (Meth)acrylic acid (Z-1) [μm] | 75 | 75 | 75 | 75 | 75 | 75 | 75 |
| Thermoplastic polymer composition layer (Y) | Thermoplastic polymer composition (Y-1) [μm] | 100 | 100 | 100 | 100 |  | 100 | 100 |
|  | Thermoplastic elastomer (Y2) [μm] |  |  |  |  | 100 |  |  |
| Intermediate layer (X) | PP-based resin (X-1) [μm] |  | 300 |  |  |  |  |  |
|  | PP-based resin (X-2) [μm] | 500 |  | 610 |  |  | 500 |  |
|  | PP-based resin (X-3) [μm] |  |  |  |  |  |  |  |
|  | PP-based resin (X-4) [μm] |  |  |  |  |  |  | 75 |
|  | PMMA-based resin (X-5) [μm] |  |  |  |  |  |  |  |
| Coextrusion film formability of thermoplastic polymer composition layer (Y) and intermediate layer (X) |  | A | A | A | B | B | A | A |
| MFR ratio (Y)/(X) [g/10 min, at 230° C. and 2.16 kg] |  | 4.9 | 8.2 | 4.9 | — | — | 8.2 | 4.9 |
| Adhesive strength between thermoplastic polymer composition layer (Y) and intermediate layer (X) (coextrusion molding) |  | AA | AA | AA | — | — | AA | AA |
| Adhesive strength [N/25 mm] |  | Broken | Broken | Broken | — | — | Broken | Broken |
| Handling properties during preforming of multilayered film (Z)/(Y)/(X)/(Y) |  | A | A | A | B | B | B | B |
| Die setting properties during insert molding preformed article |  | A | A | A | B | B | B | B |
| Bending rigidity of multilayered film [kPa · mm³] |  | 12038 | 6719 | 21811 | 59 | 55 | 30890 | 99 |
| Bending rigidity of intermediate layer (X) [kPa · mm³] |  | 11979 | 6660 | 21752 | — | — | 30830 | 40 |
| Adhesive strength between multilayered film and decorative layer (Z) (thermal lamination) |  | A | A | A | A | A | A | A |
| Adhesive strength between multilayered film and polyolefin resin (vacuum molding) |  | A | A | A | A | A | A | A |
| Adhesive strength [N/25 mm] |  | 34 | 34 | 34 | 34 | 35 | 34 | 34 |
| Adhesive strength between multilayered film and ABS resin (vacuum molding) |  | A | A | A | A | A | A | A |
| Adhesive strength [N/25 mm] |  | 18 | 18 | 18 | 18 | 19 | 18 | 18 |
| Adhesive strength between multilayered film and polyolefin resin (injection molding) |  | AA | AA | AA | AA | AA | AA | AA |
| Adhesive strength [N/25 mm] |  | Broken | Broken | Broken | Broken | Broken | Broken | Broken |
| Adhesive strength between multilayered film and ABS resin (injection molding) |  | A | A | A | A | A | A | A |
| Adhesive strength [N/25 mm] |  | 27 | 27 | 27 | 27 | 28 | 27 | 27 |

Ex.: Example,
Comp. EX.: Comparative Example

In Examples 1 to 7, in view of the fact that the multilayered film had the thermoplastic polymer resin composition layer (Y) on the both sides thereof, not only it adhered to the (meth)acrylic resin in the thermal lamination, but also the molded products having an extremely high adhesive force to the polyolefin-based resin or ABS resin were obtained in the vacuum molding and the film insert injection molding. In addition, the thermoplastic polymer resin composition layer (Y) had low tackiness at normal temperature and was not adhered at that temperature. Above all, in Examples 1 to 4 and 6 and 7 in which the polypropylene-based resin was used as the intermediate layer (X), the multilayered film was especially firmly adhered. In addition, in Examples 1 to 6 in which the MFR ratio (Y)/(X) of the thermoplastic polymer resin composition layer (Y) to the intermediate layer (X) is 1 to 15, the coextrusion film formability of the intermediate layer (X) and the thermoplastic polymer resin composition layer (Y) was also especially excellent. In addition, in view of the fact of being provided with the intermediate layer (X), the handling properties during preforming of the multilayered film and the die setting properties during insert injection molding of the preformed molded product (shape retention properties of the preformed molded product) were excellent.

On the other hand, in Example 7 in which the MFR ratio (Y)/(X) is 0.6, the coextrusion film formability of the intermediate layer (X) and the thermoplastic polymer resin composition layer (Y) was poor, and therefore, the multilayered film was slightly inferior in the designability and the thickness uniformity.

In Comparative Examples 1 and 2 regarding the single layer of the thermoplastic polymer resin composition (Y) not having the intermediate layer (X), the film was brought into excessively intimate contact with the metal roll surface and could not be released, so that it was impossible to undergo film formation. With respect to Comparative Examples 1 and 2, the handling properties during preforming using the film formed by compression molding and the shape retention properties during insert injection molding of the preformed molded product were evaluated. As a result, in the preforming, the film was warped and generated wrinkles during molding, and in the insert injection molding, the preformed molded product was deformed and had a problem in the die setting properties. In Comparative Example 3, defective shaping was generated during preforming, and the die setting properties during inert injection molding were poor.

This application is based upon and claims the benefit of priority from Japanese patent application No. 2017-111840, filed on Jun. 6, 2017, the disclosure of which is incorporated herein in its entirety by reference.

The invention claimed is:

1. A multilayered film for decorative molding of an adherend having a three-dimensional solid surface, the multilayered film comprising:
   an intermediate layer (X) comprising (i) a polypropylene-based resin or (ii) a (meth)acrylic resin, and having a bending rigidity of 60 to 30,000 kPa·mm$^3$,
   a thermoplastic polymer composition layer (Y) comprising a thermoplastic polymer composition on both surfaces of the intermediate layer (X), and
   a decorative layer (Z) comprising a resin film on a surface of either one of the layers (Y),
   wherein
   a melt flow rate (MFR) ratio (Y)/(X) of the thermoplastic polymer composition layer (Y) to the intermediate layer (X), as measured under conditions at a temperature of 230° C. under a load of 2.16 kg (21.2 N), is from 1 to 15; and
   the thermoplastic polymer composition contains from 5 to 50 parts by mass of a polypropylene-based resin (B) based on 100 parts by mass of a thermoplastic elastomer (A) that is a block copolymer containing
   a polymer block (a1) comprising an aromatic vinyl compound unit and
   a polymer block (a2) comprising a conjugated diene compound unit, or a hydrogenated product thereof.

2. The multilayered film according to claim 1, wherein the conjugated diene compound of the polymer block (a2) in the thermoplastic elastomer (A) is butadiene, isoprene, or butadiene and isoprene, and a sum total of a 1,2-bond amount and a 3,4-bond amount in the polymer block (a2) is from 35 to 98 mol %.

3. The multilayered film according to claim 1, wherein a content of the thermoplastic elastomer (A) in the thermoplastic polymer composition is 50% by mass or more.

4. The multilayered film according to claim 1, wherein the thermoplastic polymer composition optionally further contains a tackifying resin in a content of less than 1% by mass.

5. The multilayered film according to claim 1, wherein the thermoplastic polymer composition contains the polypropylene-based resin (B), which is a polar group-containing polypropylene-based resin (B1).

6. The multilayered film according to claim 1, wherein in the polypropylene-based or (meth)acrylic resin to be used in the intermediate layer (X), an MFR measured under conditions at a temperature of 230° ° C. under a load of 2.16 kg (21.2 N) is from 0.1 to 20 g/10 min.

7. The multilayered film according to claim 1, wherein a thickness ratio (Y)/(X) of the thermoplastic polymer composition layer (Y) to the intermediate layer (X) is from 0.1 to 18.

8. The multilayered film according to claim 1, which is applied for any of a vacuum molding method, a pressure molding method, a vacuum pressure molding method, a compression molding method, or a preform and film insert injection molding method.

9. A method for producing the multilayered film according to claim 1, the method comprising: bringing the thermoplastic polymer composition layer (Y) as a surface layer in a molten state into contact with a roll whose surface is made of a hydrophobic resin.

10. A method for producing the multilayered film according to claim 1, the method comprising:
   laminating the intermediate layer (X) and the thermoplastic polymer composition layer (Y) through coextrusion.

11. The method according to claim 10, further comprising:
   after said laminating, bringing the thermoplastic polymer composition layer (Y) as a surface layer in a molten state into contact with a cast roll whose surface is made of a hydrophobic resin.

12. A method for producing the multilayered film according to claim 1, the method comprising:
   sticking the decorative layer (Z) on either surface of the multilayered film by thermal lamination using two heating rollers.

* * * * *